(12) United States Patent
Ushiroda

(10) Patent No.: US 6,831,756 B1
(45) Date of Patent: Dec. 14, 2004

(54) IMAGE PROCESSING METHOD AND APPARATUS FOR PERFORMING HALFTONE CONVERSION

(75) Inventor: Atsushi Ushiroda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/537,290

(22) Filed: Mar. 29, 2000

(30) Foreign Application Priority Data

Mar. 30, 1999 (JP) ............................................ 11-090068
Mar. 7, 2000 (JP) ...................................... 2000-062271

(51) Int. Cl.⁷ .............................................. H04N 1/405
(52) U.S. Cl. ...................... 358/1.9; 358/3.22; 358/3.23; 358/3.13
(58) Field of Search ................ 358/1.1–1.9, 1.11–1.18, 358/2.99, 3.01, 3.03, 3.04, 3.05, 3.06, 3.13, 3.16, 3.21–3.26; 382/270–273; 345/596–599

(56) References Cited

U.S. PATENT DOCUMENTS 4,528,693 A * 7/1985 Pearson et al. ............. 382/299
4,698,691 A * 10/1987 Suzuki et al. ................ 358/3.2
5,390,262 A * 2/1995 Pope ........................... 382/234

* cited by examiner

Primary Examiner—King Y. Poon
(74) Attorney, Agent, or Firm—Fitzpatrick, Cella, Harper & Scinto

(57) ABSTRACT

From a first threshold mask having threshold values corresponding to the number of gray levels, which is larger than that of an input image, a second threshold mask having threshold values corresponding to the number of gray levels, which is equal to that of an input image, is generated on the basis of tone reproduction characteristics corresponding to the type of paper used in a printer or the printer state. Using the generated second threshold mask, the number of gray levels of the input image is converted, and the converted image is output to an output apparatus.

In this manner, a high-quality image can be output by making halftone conversion corresponding to the tone reproduction characteristics of the output apparatus by a small memory size without decreasing the number of gray levels of the input image.

21 Claims, 20 Drawing Sheets

FIG. 2

|      | 0     | 1     | 2     | 3     | 4     | 5     |
|------|-------|-------|-------|-------|-------|-------|
| 0    | 26106 | 10973 | 23831 | 256   | 20790 | 35658 |
| 256  | 49807 | 39874 | 61633 | 43663 | 54533 | 14791 |
| 512  | 20290 | 5023  | 16396 | 31502 | 9084  | 38509 |
| 768  | 64300 | 37316 | 48547 | 57059 | 22203 | 46959 |
| 1024 | 51748 | 24942 | 11507 | 28275 | 3098  | 63256 |
| 1028 | 40587 | 6876  | 61018 | 36155 | 52797 | 18321 |
| 1536 | 15298 | 47677 | 20949 | 42661 | 12975 | 30308 |
| 1792 | 26152 | 58050 | 33061 | 972   | 49714 | 55694 |
| 2048 | 39604 | 10040 | 17585 | 62392 | 26845 | 18999 |

FIG. 3

| INPUT VALUE | NUMBER OF ON DOTS |
|:-:|:-:|
| 0 | 0 |
| 1 | 5 |
| 2 | 29 |
| 3 | 68 |
| ⋮ | ⋮ |
| 128 | 23592 |
| ⋮ | ⋮ |
| 138 | 26000 |
| 139 | 27020 |
| ⋮ | ⋮ |
| 255 | 65536 |

FIG. 4

|      | 0   | 1   | 2   | 3   | 4   | 5   |
|------|-----|-----|-----|-----|-----|-----|
| 0    | 139 | 78  | 131 | 7   | 120 | 171 |
| 256  | 213 | 184 | 246 | 196 | 227 | 96  |
| 512  | 118 | 47  | 102 | 157 | 69  | 180 |
| 768  | 253 | 176 | 210 | 234 | 125 | 205 |
| 1024 | 219 | 135 | 81  | 147 | 34  | 250 |
| 1028 | 186 | 58  | 244 | 173 | 222 | 110 |
| 1536 | 98  | 207 | 120 | 193 | 88  | 153 |
| 1792 | 139 | 236 | 163 | 16  | 213 | 230 |
| 2048 | 183 | 74  | 107 | 248 | 142 | 113 |
|      |     |     |     |     |     |     |

FIG. 8

| INPUT VALUE | NUMBER OF ON DOTS |
|---|---|
| 0 | 0 |
| 1 | 257 |
| 2 | 514 |
| 3 | 771 |
| ⋮ | ⋮ |
| 255 | 65536 |

F I G. 10

| PATCH NUMBER | INPUT VALUE | DENSITY D | DENSITY D' |
|---|---|---|---|
| 1 | 0 | 0.00 | 0.00 |
| 2 | 32 | 0.14 | 0.21 |
| 3 | 64 | 0.50 | 0.49 |
| 4 | 96 | 0.82 | 0.89 |
| 5 | 128 | 1.35 | 1.21 |
| 6 | 159 | 1.47 | 1.45 |
| 7 | 191 | 1.52 | 1.51 |
| 8 | 223 | 1.54 | 1.55 |
| 9 | 255 | 1.60 | 1.60 |

FIG. 16

| ADDRESS | DENSITY VALUE | NUMBER OF ON DOTS |
|---|---|---|
| 0 | 0.00 | 0 |
| 1 | 0.01 | 5 |
| 2 | 0.02 | 29 |
| 3 | 0.03 | 68 |
| ⋮ | ⋮ | ⋮ |
| 159 | 1.59 | 65342 |
| 160 | 1.60 | 65536 |

F I G. 18
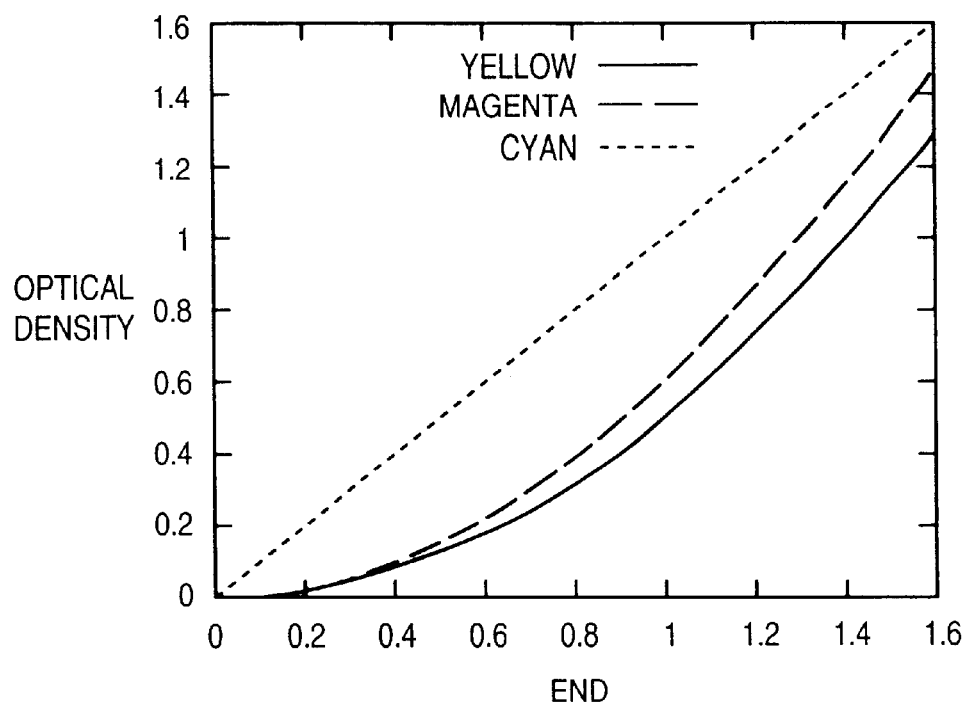

FIG. 20

| PATCH NUMBER | INPUT VALUE | SENSOR OUTPUT | PREDICTED DENSITY |
|---|---|---|---|
| 1 | 0 | 10.05 | 0.00 |
| 2 | 32 | 6.22 | 0.21 |
| 3 | 64 | 3.24 | 0.49 |
| 4 | 96 | 1.35 | 0.89 |
| 5 | 128 | 0.62 | 1.21 |
| 6 | 159 | 0.33 | 1.45 |
| 7 | 191 | 0.31 | 1.51 |
| 8 | 223 | 0.28 | 1.55 |
| 9 | 255 | 0.25 | 1.60 |

IMAGE PROCESSING METHOD AND APPARATUS FOR PERFORMING HALFTONE CONVERSION

FIELD OF THE INVENTION

The present invention relates to an image processing method and apparatus for performing halftone conversion using a threshold mask so as to output an image to an output apparatus which has the number of gray levels smaller than that of an input image.

BACKGROUND OF THE INVENTION

Conventionally, ordered dithering, a blue noise mask method, and the like are known as halftone processes for expressing a multi-valued (multi-level) image in a binary output apparatus. In these methods, the number of ON dots of an output image increases in proportion to the pixel value of an input image. For example, when an input image has 8-bit precision, the number of ON dots of an output image ranges from "0" to "255" pixels per 255 pixels with respect to an input value ranging from "0" to "255". On the other hand, an output apparatus such as an ink-jet printer cannot obtain an output proportional to an input value due to mechanical and optical dot gains.

For this reason, a correction process for canceling the characteristics of the output apparatus is required. As correction methods, a method of halftoning an input value which is corrected using a look-up table (LUT) that outputs a corrected 8-bit value in response to an 8-bit input, a method using a threshold mask that has a nonlinear dot gain characteristic, and the like have been proposed.

However, in the conventional method using an LUT, when the numbers of levels of the input and output of the LUT are equal to each other, the number of gray levels of an input image may decrease as a result of looking up the LUT.

On the other hand, in the method using a threshold mask that has a nonlinear dot gain characteristic, threshold masks corresponding to, e.g., different output characteristics depending on the types of paper used in print processes are required.

Furthermore, when the characteristics of an input image are different from the target characteristics of correction, an additional correction process is required and, as a result, the number of gray levels of an input image cannot be maintained.

SUMMARY OF THE INVENTION

It is an object of the present invention to provide an image processing method and apparatus, which can solve the conventional problems, can perform halftone conversion corresponding to the tone reproduction characteristics of an output apparatus by a small memory size without decreasing the number of gray levels of an input image, and can output a high-quality image.

It is another object of the present invention to provide an image processing method and apparatus, which can correct the tone reproduction characteristics by a small memory size by generating a second threshold mask having threshold values corresponding to the number of gray levels, which is equal to that of an input image, from a first threshold mask having threshold values corresponding to the number of gray levels, which is larger than that of the input image, on the basis of tone reproduction characteristics corresponding to the type of paper used in a printer or the printer state.

It is still another object of the present invention to provide an image processing method and apparatus which can correct an image to have arbitrary input/output characteristics by a small memory size for a plurality of paper types having different output characteristics by generating threshold values of a daughter mask in accordance with an LUT having output characteristics corresponding to the type of paper used in a printer, and the relationship between the input value and output density.

It is still another object of the present invention to provide an image processing method and apparatus which can output a color image with an arbitrary color balance by a small memory size by generating threshold masks in units of colors in accordance with LUTs having output characteristics in units of colors corresponding to the type of paper used in a printer, and input/output characteristics designated in units of colors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of a mother mask 10 according to the first embodiment;

FIG. 3 shows an example of an output dot number correction look-up table (LUT) 11 according to the first embodiment;

FIG. 4 shows an example of a daughter mask 15 generated from the mother mask 10 in accordance with the LUT shown in FIG. 3;

FIG. 8 shows an example of a non-correction LUT;

FIG. 10 is a table showing an example of the input values and measured density values of patches;

FIG. 16 shows an example of an LUT 22 according to the second embodiment;

FIG. 18 is a graph showing the color balance for outputting achromatic gray for a given paper sheet;

FIG. 20 is a table showing the relationship between the output voltage of a density sensor and the predicted density.

DETAILED DESCRIPTION OF THE PREFERRED EMBODIMENTS

Preferred embodiments of the present invention will now be described in detail in accordance with the accompanying drawings.

[First Embodiment]

Figure 1:
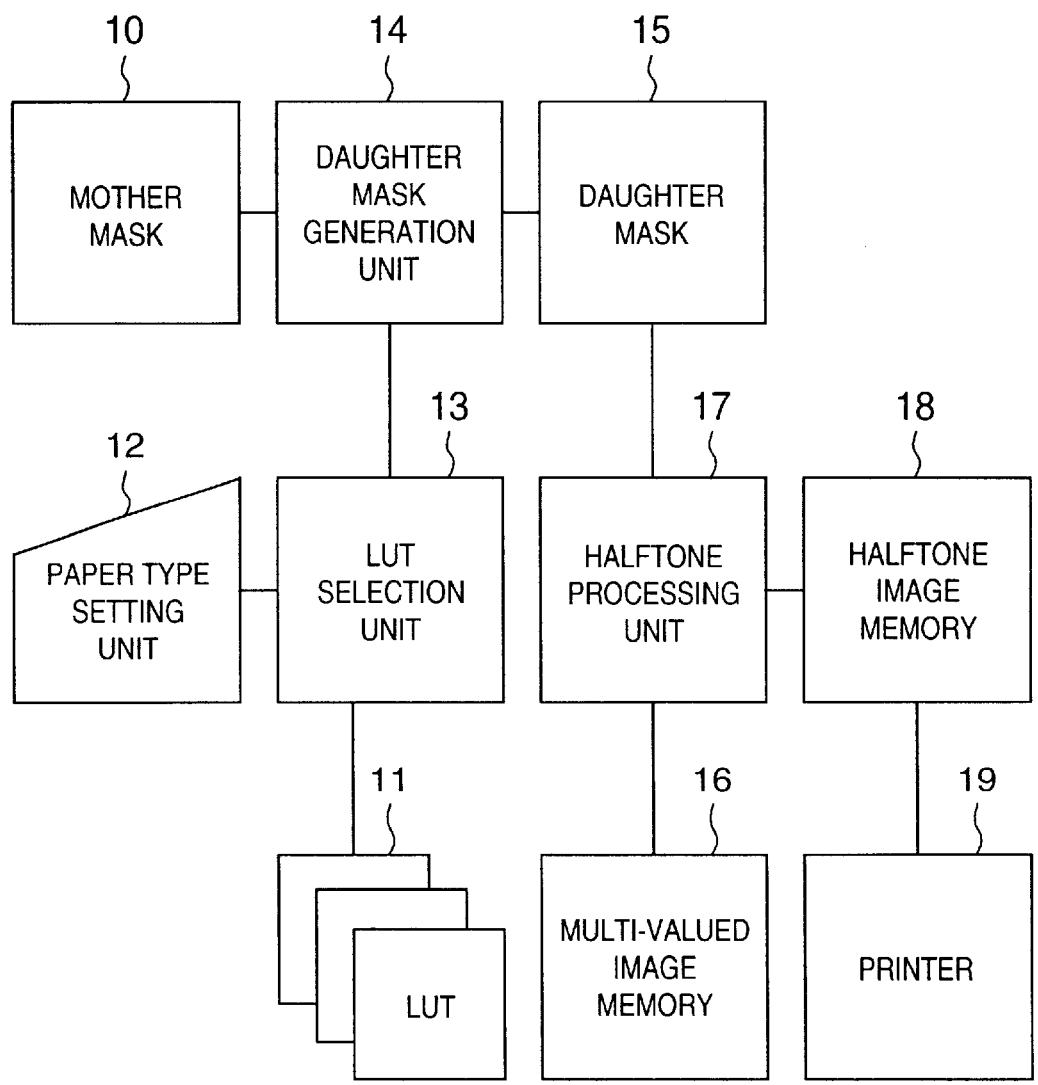
FIG. 1 is a block diagram showing the arrangement of an image processing apparatus according to the first embodiment of the present invention.

FIG. 1 is a block diagram showing the arrangement of an image processing apparatus according to the first embodiment. Referring to FIG. 1, reference numeral 10 denotes a mother threshold mask (mother mask) which comprises, e.g., a ROM or the like, and consists of 256 (vertical)×256 (horizontal) items, each of which stores a value ranging from "1" to "65536". Reference numeral 11 denotes output dot number correction look-up tables (LUTs), which comprise, e.g., a ROM or the like, and store correction values determined in advance by measurement in units of paper types. Reference numeral 12 denotes a paper type setting unit with which the user sets the paper type. Reference numeral 13 denotes an LUT selection unit for selecting one of the plurality of output dot number correction LUTs 11 on the basis of the selected paper type. Reference numeral 14 denotes a daughter mask generation unit for generating a daughter threshold mask (to be described below) from the mother mask 10 in accordance with the selected LUT.

Reference numeral 15 denotes a daughter threshold mask (daughter mask), which comprises, e.g., a RAM or the like, and has the same number of items as that of the mother mask 10. In this mask, each item stores a value ranging from "1" to "255". Reference numeral 16 denotes a multi-valued image memory (RAM) for storing multi-valued image data. Each pixel value of multi-valued image data has a value ranging from "0" to "255" expressed by 8 bits. Reference numeral 17 denotes a halftone processing unit for comparing the pixel values of multi-valued image data and threshold values of the daughter mask 15 in turn, thus generating and storing pixels of a halftone image. Reference numeral 18 denotes a halftone image memory (RAM) which stores a halftone image obtained by the halftone process. Reference numeral 19 denotes a binary printer for outputting a halftone image. Note that the image processing apparatus of this embodiment comprises a controller (not shown) constructed by a CPU, ROM, and RAM, and the respective building components of the apparatus are controlled by the controller.

The processing sequence for processing and outputting an image by the image processing apparatus of this embodiment will be explained below. The user of the image processing apparatus designates the type of paper to be set on the printer 19 using the paper type setting unit 12. For example, one of normal paper, coated paper, and glossy paper is designated. The LUT selection unit 13 selects an LUT corresponding to the paper type designated by the user from the output dot number correction LUTs 11, and passes it on to the daughter mask generation unit 14. The daughter mask generation unit 14 generates a daughter mask 15 from the mother mask 10 in accordance with the selected LUT by a given method to be described in detail later. The halftone processing unit 17 compares the pixel values of image data stored in the multi-valued image memory 16 with threshold values of the daughter mask 15 to determine ON/OFF states of individual pixels of a halftone image. The printer 19 then forms an image on a paper surface in accordance with the determined ON/OFF states of the pixels of the halftone image.

FIG. 2 shows an example of the mother mask 10 according to this embodiment. As shown in FIG. 2, the values in cells are individual threshold values, and values ranging from "1" to "65536" are stored. The number of gray levels of input image data is 256 (8 bits), and the number of gray levels of the mother mask is 65536 that is larger than that of the input image data. Note that numerals at the left end outside the table are mask addresses in the left end column, and numerals above the table are offsets from the left end. On the other hand, each threshold value is accessed by an address obtained by adding an offset value to the address of the left end column. As a method of generating such threshold mask, for example, a blue noise mask method, void cluster method, and the like are known.

FIG. 3 shows an example of the output dot number correction look-up table (LUT) 11 according to this embodiment. As shown in FIG. 3, the numbers of ON dots ranging from "0" to "65536" are stored in correspondence with input values ranging from "0" to "255".

FIG. 4 shows an example of the daughter mask 15 generated from the mother mask 10 in accordance with the LUT shown in FIG. 3. As shown in FIG. 4, each cell stores a threshold value which ranges from "1" to "255". That is, the daughter mask 15 has threshold values, the number of which is equal to the number of gray levels of input image data. Numerals outside the table indicate the addresses of threshold values as in FIG. 2.

The halftone process by the halftone processing unit 17 will be described in detail below.

Figure 5:
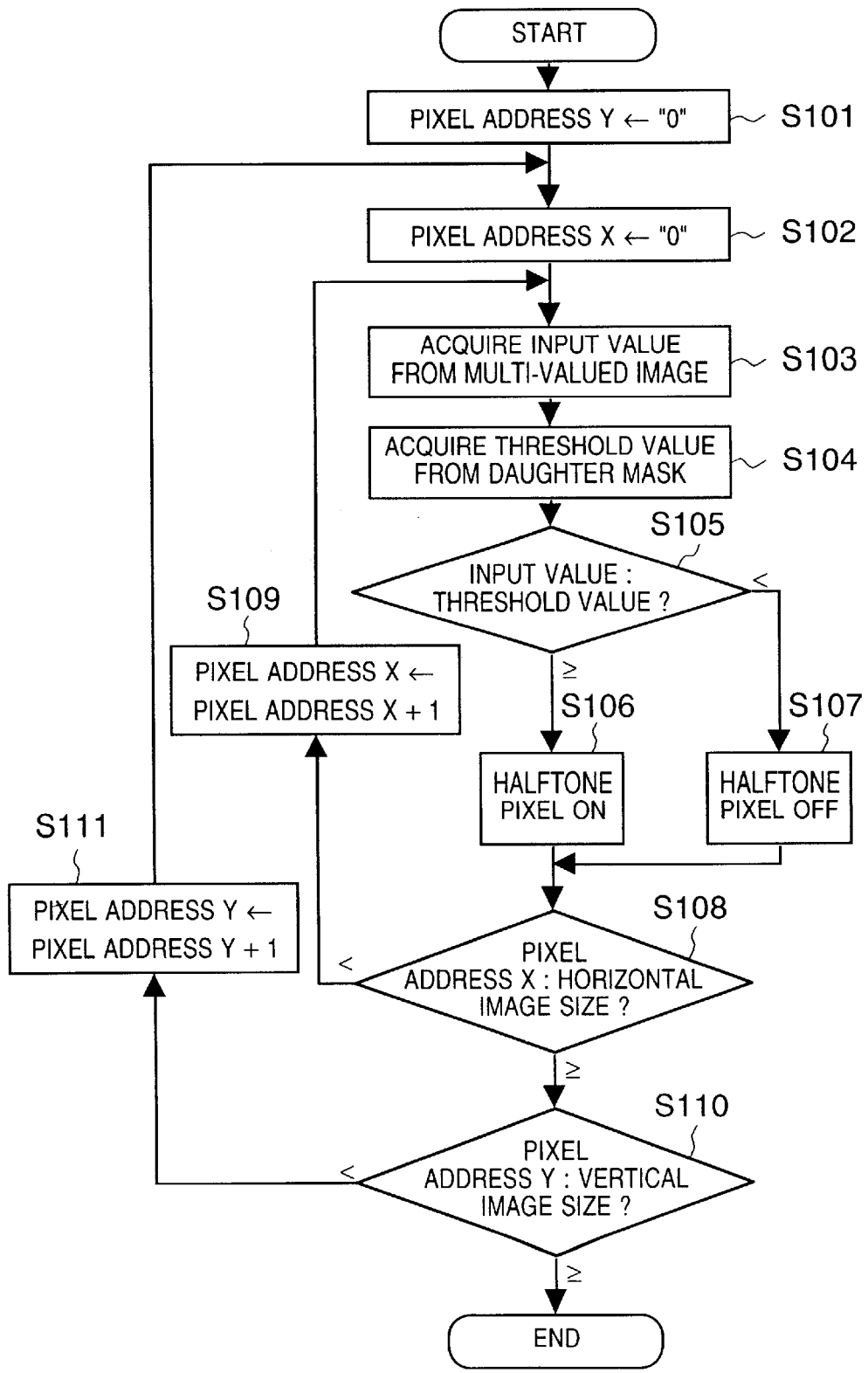
FIG. 5 is a flow chart showing a halftone process according to the first embodiment.

FIG. 5 is a flow chart showing the halftoning of this embodiment. A pixel address counter Y that designates the vertical address of a pixel to be processed in image data is reset to "0" (step S101). Also, a pixel address counter X that designates the horizontal coordinate is reset to "0" (step S102). Then, a pixel value of a multi-valued image designated by the address Multi-valued pixel address
=X+Y×Horizontal image size
using the pixel address counters X and Y is acquired as an input value (step S103).

That threshold value of the daughter mask 15, which is designated by lower 8-bit values of the pixel address counters X and Y is acquired (step S104). The address of the threshold value is given by:

Threshold value address
=$X_8$+$Y_8$×Daughter mask horizontal size
where $X_8$ is the lower 8 bits of X, and $Y_8$ is the lower 8 bits of Y. The input value is compared with the threshold value (step S105). If the input value is equal to or larger than the threshold value, the corresponding pixel value of the halftone image memory 18 is set ON (step S106); otherwise, the corresponding pixel value of the halftone image memory 18 is set OFF (step S107). Note that the address of the corresponding pixel value of the halftone image memory 18 is given by:

Halftone pixel address
=X+Y×Horizontal image size
The pixel address counter X is compared with the horizontal image size (step S108). If the pixel address counter X is smaller than the horizontal image size, the value of the pixel address counter X is incremented by 1 (step S109), and the flow returns to step S103 to repeat the aforementioned process. On the other hand, if the pixel address counter X is equal to the horizontal image size, the pixel address counter Y is compared with the vertical image size (step S110). If the pixel address counter Y is smaller than the vertical image size, the value of the pixel address counter Y is incremented by 1 (step S111), and the flow returns to step S102 to repeat the aforementioned process. On the other hand, if the pixel address counter Y is equal to the vertical image size, the halftone process ends.

The process for generating the daughter mask 15 from the mother mask 10 in accordance with the output dot number correction look-up table (LUT) 11 will be explained below.

Figure 6:
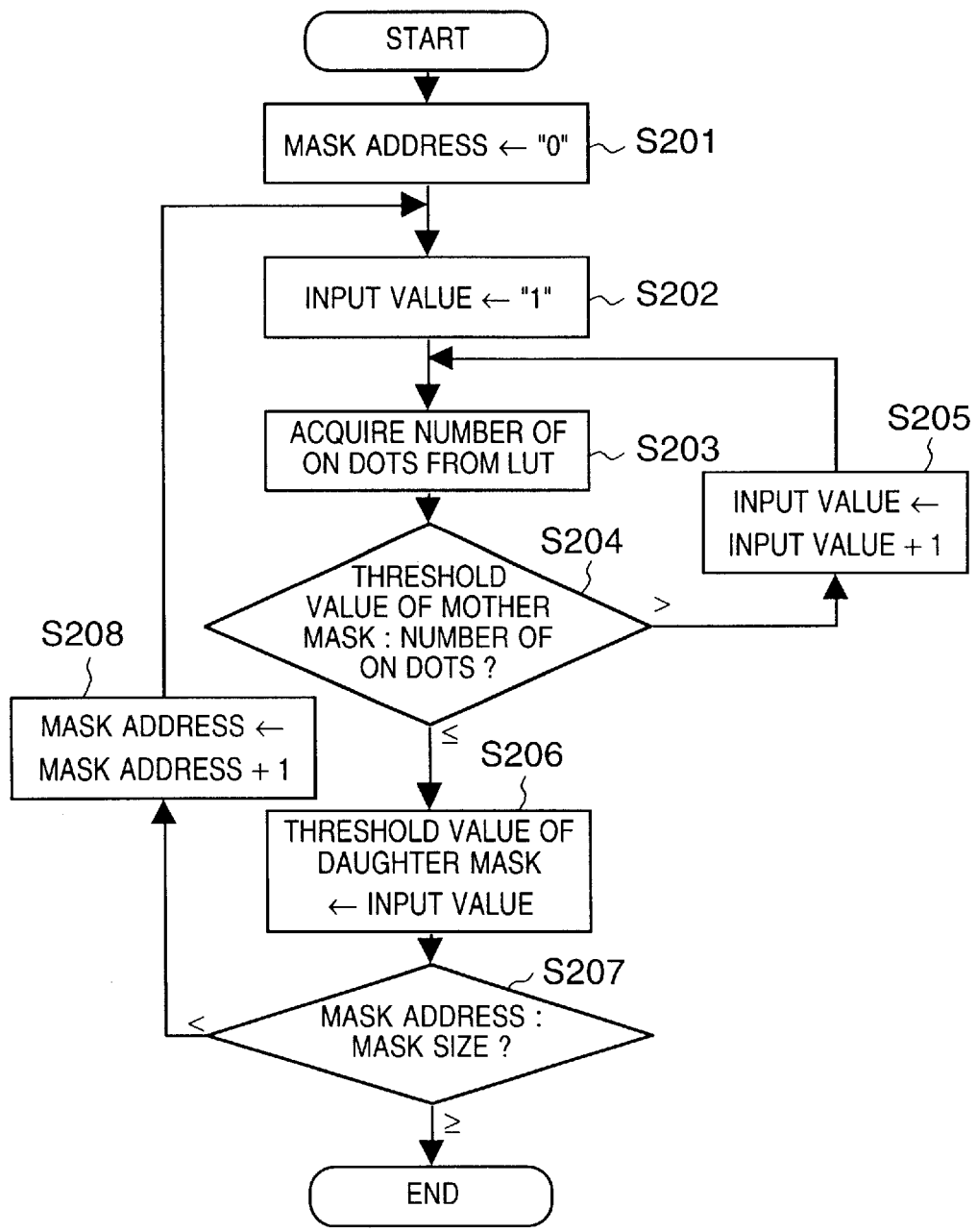
FIG. 6 is a flow chart showing a generation process of the daughter mask 15 according to the first embodiment.

FIG. 6 is a flow chart showing the generation process of the daughter mask 15 according to the first embodiment. A mask address counter for designating the positions of the mother and daughter masks is reset to "0" (step S201). Also, the input value is reset to "1" (step S202). The number of ON dots corresponding to the input value is acquired from the LUT 11 (step S203). For example, in the LUT shown in FIG. 3, if the input value is "1", the number of ON dots is "5". A threshold value at the position of the mother mask 10 designated by the mask address counter is compared with the number of ON dots (step S204). For example, in the mother mask shown in FIG. 2, a threshold value corresponding to mask address "0" is "26106".

If the threshold value at the position of the mother mask 10 designated by the mask address counter is larger than the number of ON dots, the input value is incremented by 1 (step S205), and the flow returns to step S203 to repeat the aforementioned process. On the other hand, if the threshold value is equal to or smaller than the number of ON dots, the current value is set as a threshold value at the position of the daughter mask 15 designated by the mask address counter (step S206). In this case, since the threshold value of the mother mask 10 corresponding to address "0" is "26106", and the number of ON dots corresponding to the input value="1" is "5", the flow advances to step S205 as a result of comparison in step S204. Since the number of ON dots corresponding to an input value="139" in FIG. 3 exceeds the threshold value "26106" in FIG. 2, the value "139" is set as a threshold value at address "0" of the daughter mask. The mask address counter is then compared with the mask size (step S207). If the value of the mask address counter has not reached the end of the mask, the value of the mask address counter is incremented by 1 (step S208), and the flow returns to step S202 to repeat the aforementioned process. If the value of the mask address counter has reached the end of the mask, the generation process of the daughter mask 15 ends.

An operation for generating the output dot number correction look-up table (LUT) 11 will be explained below. The output characteristics of the printer corresponding to a specific paper type (e.g., coat paper) are obtained, and correction values for obtaining tone reproduction characteristics with which an expected output is obtained in response to an input, e.g., density increases in proportion to the input value, are obtained by correcting the output characteristics. For example, a daughter mask is generated using a non-correction LUT having the relationship between the input value and ON dot ratio shown in FIG. 7. FIG. 8 shows an example of the non-correction LUT. The number O of dots and an input value I satisfy:

$$O=\text{Int}\{(I/255)\times 65536\}$$

where Int(x) is a function of obtaining an integer part of x.

Figure 9:
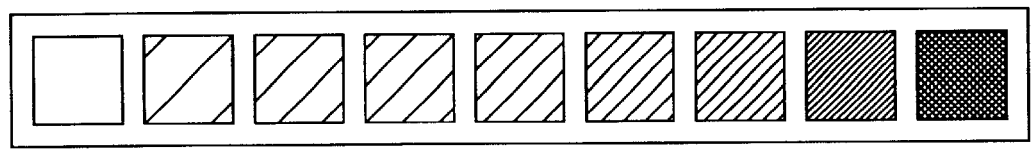
FIG. 9 shows a step chart in which the input value increases stepwise.

Subsequently, a step chart, in which the input value increases stepwise, as shown in FIG. 9, undergoes the halftone process, and its halftone image is output by the printer onto a paper sheet for which the LUT is to be generated. The densities of patches of the output step chart are measured by a densitometer. FIG. 10 shows an example of the input values and measured density values of the patches. Referring to FIG. 10, density D' is a value obtained by smoothing the measured value by absorbing variations of the printer and measurement errors. In this case, the following moving average is used:

$$D'(i)=\{D(i-1)+D(i)+D(i+1)\}/3 (0<i<8)$$

$$D'(i)=D(i) (i=0, i=8)$$

where i is the patch number, D(i) is the density value of patch number i, and D'(i) is the smoothed density value.

In this manner, the output characteristics of a printer corresponding to each paper type can be obtained. A method of computing a correction table for obtaining the relationship in which the density increases in proportion to the input in a printer having such output characteristics will be explained below.

Figure 11:
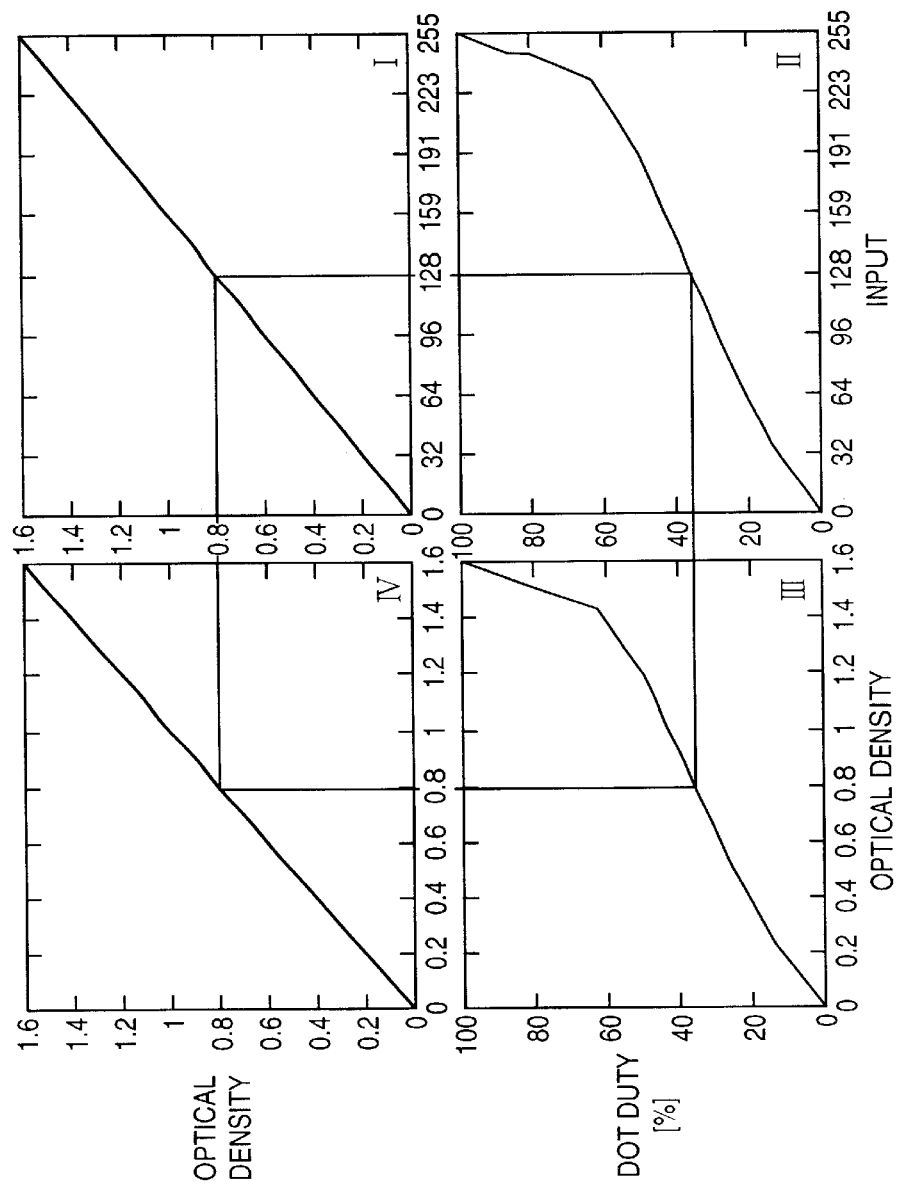
FIG. 11 is a graph showing the characteristics in which the density is proportional to the input value.
Figure 12:
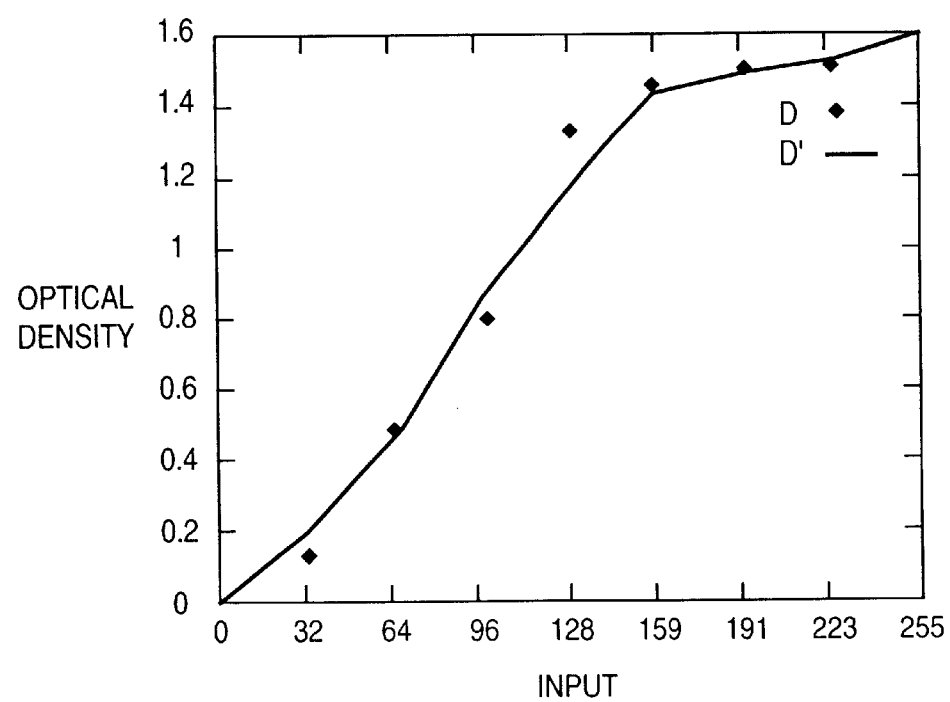
FIG. 12 is a graph showing the tone reproduction characteristics of an output apparatus.

The graph of quadrant I shown in FIG. 11 represents the total characteristics to be finally obtained, i.e., characteristics in which the density is proportional to the input value. FIG. 12 is a graph of the result of FIG. 10. Also, the graph of quadrant III is obtained by converting the input value in the tone reproduction characteristics shown in FIG. 12 into the ON dot ratio, and replacing the ordinate and abscissa. A case will be examined below wherein a correction value corresponding to an input value "128" is obtained. An output density "0.8" is obtained from the total characteristic graph of quadrant I with respect to the input value. That is, in order to obtain the output density "0.8" from the characteristic graph of quadrant III, the ON dot ratio can be set at 36%.

Therefore, the correction table can correct to set 36% ON dots with respect to the input value "128". That is, the number of ON dots corresponding to the input value "128" is 23592 ($\approx$65536$\times$0.36), as shown in FIG. 3. In this manner, correction values corresponding to all input values can be obtained.

As described above, according to the first embodiment, since LUTs corresponding to paper types are provided, the output characteristics of the printer can be corrected by a smaller memory size than that required for mask patterns corresponding to all the paper types without impairing precision by intermediate computations.

In this embodiment, a binary printer has been exemplified as an output apparatus. However, the present invention is not limited to such specific printer, but can be applied to any other printers as long as they have the number of gray levels smaller than that of an input image.

[Second Embodiment]

The second embodiment of the present invention will be described in detail below with reference to the accompanying drawings.

Figure 13:
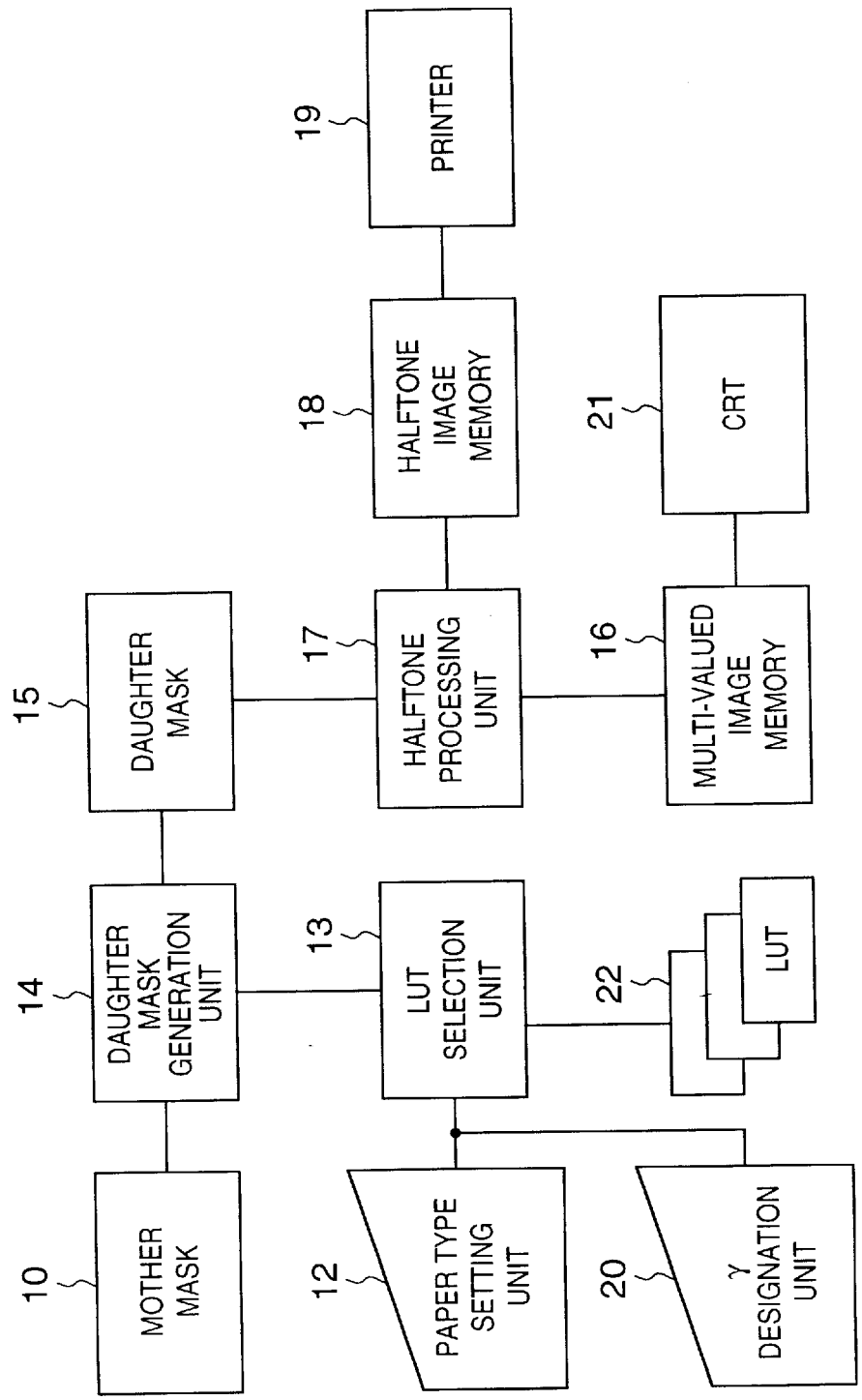
FIG. 13 is a block diagram showing the arrangement of an image processing apparatus according to the second embodiment of the present invention.

FIG. 13 is a block diagram showing the arrangement of an image processing apparatus according to the second embodiment. As shown in FIG. 13, in the second embodiment, a γ designation unit 20 for designating a γ value of image data, and a CRT display 21 for displaying image data are added to the image processing apparatus of the first embodiment. Note that output dot number correction look-up tables (LUTs) 22 store output characteristics of the printer in units of paper types. The LUTs 22 will be described in detail later.

Normally, in a CRT display, a luminance Y of each pixel has characteristics of the γ-th power with respect to a strength V of an input signal:

$$Y=V^\gamma$$

Therefore, in order to output an image having the same brightness as that of image displayed on the CRT display 21 by the printer 19, correction that considers γ of the CRT display 21 must be done. A method of computing correction values for γ values=1.0 and 2.2 will be explained below with reference to FIG. 14.

Figure 14:
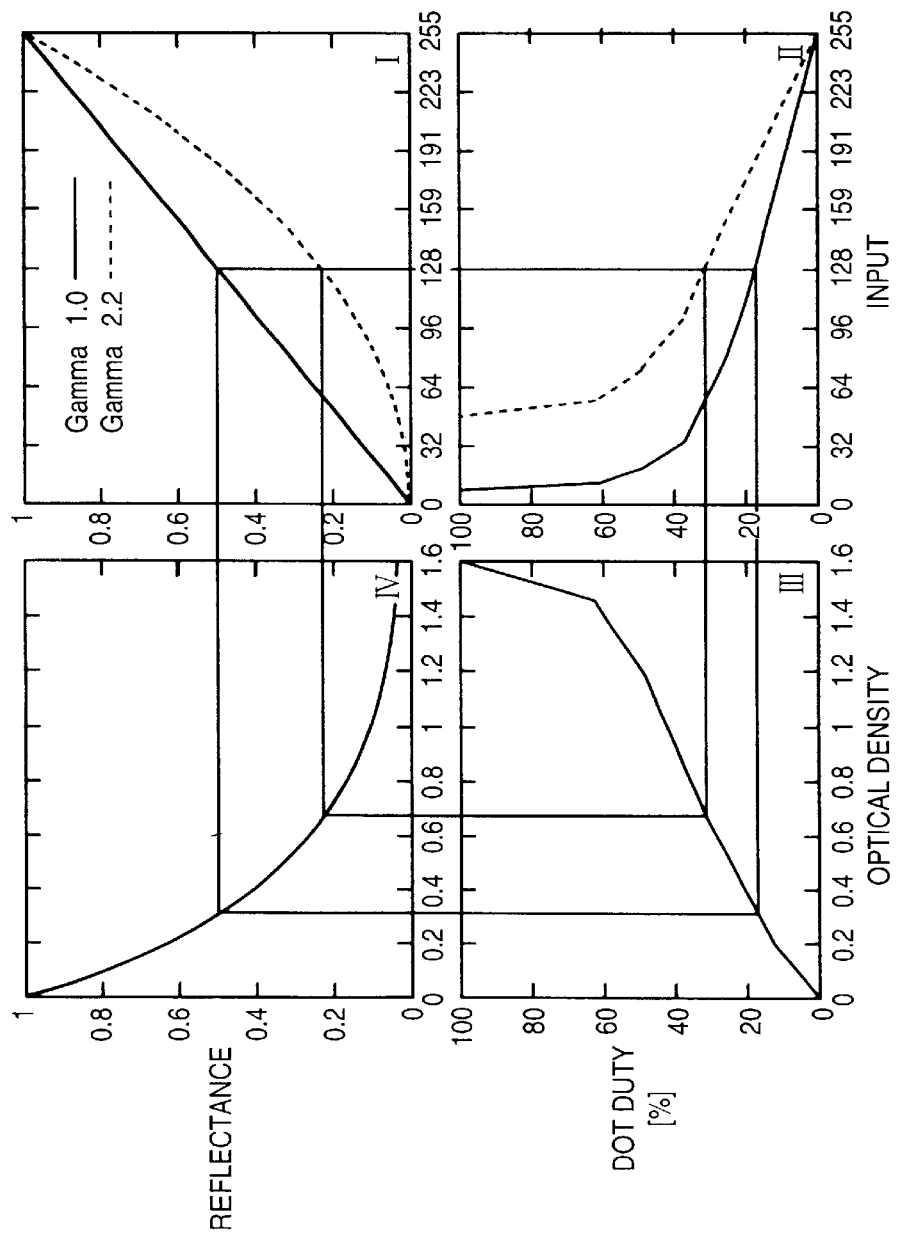
FIG. 14 is a graph showing the characteristics that can obtain reflectances of γ values=1.0 (solid curve) and 2.2 (dotted curve) with respect to the input value.

The graph of quadrant I shown in FIG. 14 shows the total characteristics to be finally obtained, i.e., characteristics that can obtain reflectances of γ values=1.0 (solid curve) and 2.2 (dotted curve) with respect to an input value. Also, the graph of quadrant IV shows the relationship between the density and reflectance, which is given by:

$$R=10^{-D}$$

where R is the reflectance, and D is the density.

Furthermore, the graph of quadrant III shows the output characteristics of the printer corresponding to a given paper type. A correction value corresponding to an input value "128" when the γ value=1.0 is computed as follows. As can be seen from the graph of quadrant I, an output reflectance corresponding to the input value "128" is "0.5". Also, as can be seen from the graph of quadrant IV, the reflectance "0.5" is converted into a density "0.3".

As can be seen from the graph of quadrant III, the ON dot ratio can be set at 18% to obtain the output density "0.3".

Hence, the correction table can correct to set ON dots at a ratio of 18% with respect to the input value "128". In this manner, correction values corresponding to all input values can be obtained.

Figure 15:
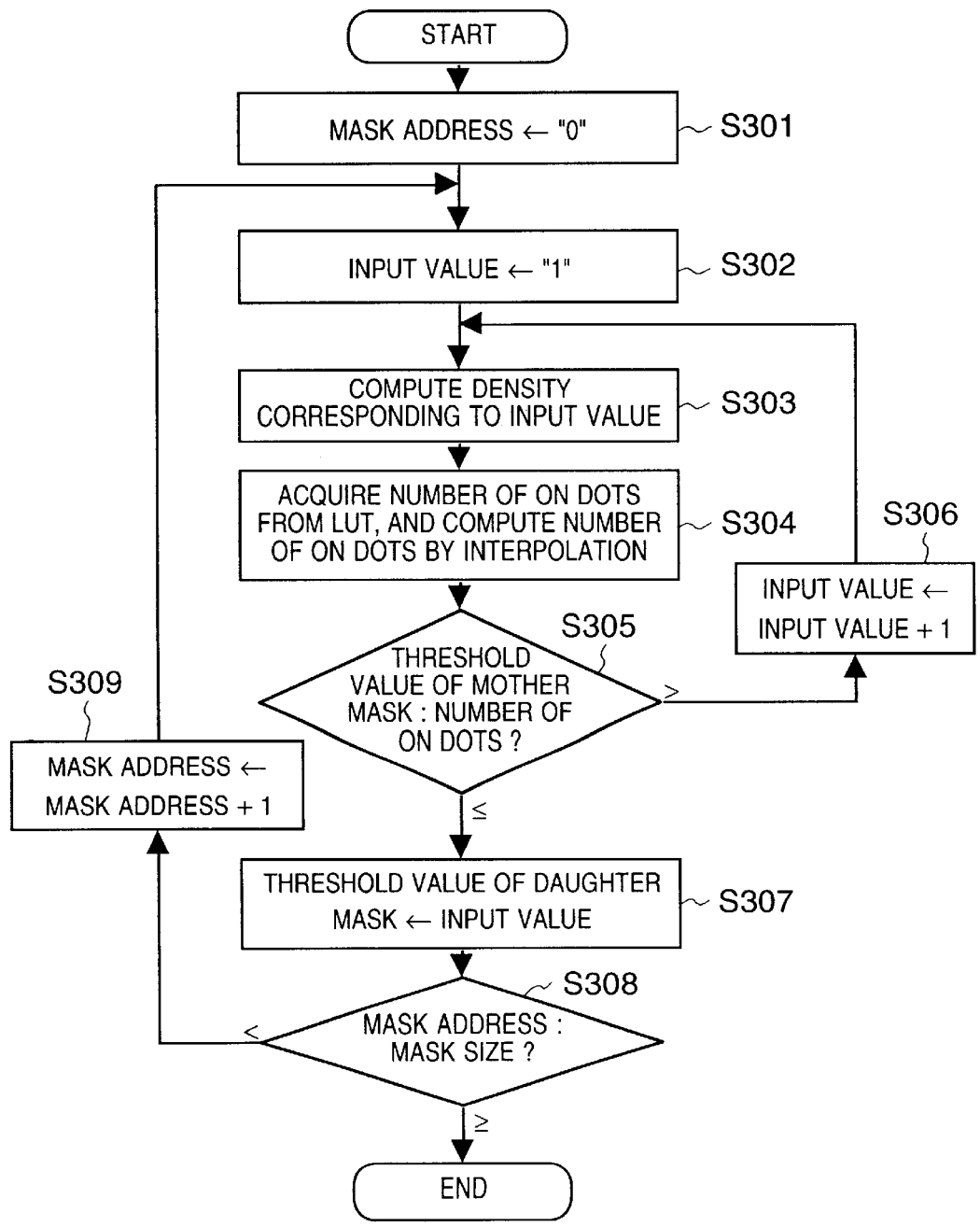
FIG. 15 is a flow chart showing a generation process of a daughter mask according to the second embodiment.

FIG. 15 is a flow chart showing the generation process of a daughter mask according to the second embodiment. This flow chart is executed by a controller (not shown). As shown in FIG. 15, processes in steps S303 and S304 shown in FIG. 15 correspond to that in step S203 shown in FIG. 6 of the first embodiment. In the second embodiment, each LUT 22 stores the output characteristics of the printer, i.e., the relationship between the density and the number of ON dots. The daughter mask generation unit 14 computes an output density corresponding to an input value (step S303), and obtains the number of ON dots from the LUT 22 on the basis of the computed output density (step S304). For example, when an image with a γ value "2.2" is to be output, the following computation is made in step S303:

$$D=-2.2\log_{10}^{(1/255)}$$

FIG. 16 shows an example of the LUT 22 according to the second embodiment. In this example, the output characteristics of the printer corresponding to a given paper type are stored as a table. The numbers of ON dots are stored in correspondence with density values. Note that the density values are stored in 0.01-increments to save the required memory size. In this embodiment, in order to improve precision, the number of ON dots is computed by interpolation on the basis of the number of ON dots corresponding to the density value shown in FIG. 16.

In step S304, the number O of ON dots is computed with reference to FIG. 16 from the density value D obtained in step S303 by:

$$i=\text{Int}(D\times100)$$

$$O=(O[i+1]-O[i])\times(D\times100-i)+O[i]$$

where i is the LUT address, and O[i] is the number of ON dots corresponding to i.

For example, when the density value is 0.025, i=2, and O=(68−29)×(2.5−2)+29=48.5.

The processes in steps S305 to S309 are the same as those in steps S204 to S208.

As described above, according to the second embodiment, since the threshold values of the daughter mask are sequentially generated based on the LUT having output characteristics corresponding to a given paper type and the relationship between the input value and output density, an image can be corrected and output to obtain arbitrary input/output characteristics by a small memory size for a plurality of paper types having different output characteristics without impairing precision by intermediate computations.

[Third Embodiment]

The third embodiment of the present invention will be described in detail below with reference to the accompanying drawings.

Figure 17:
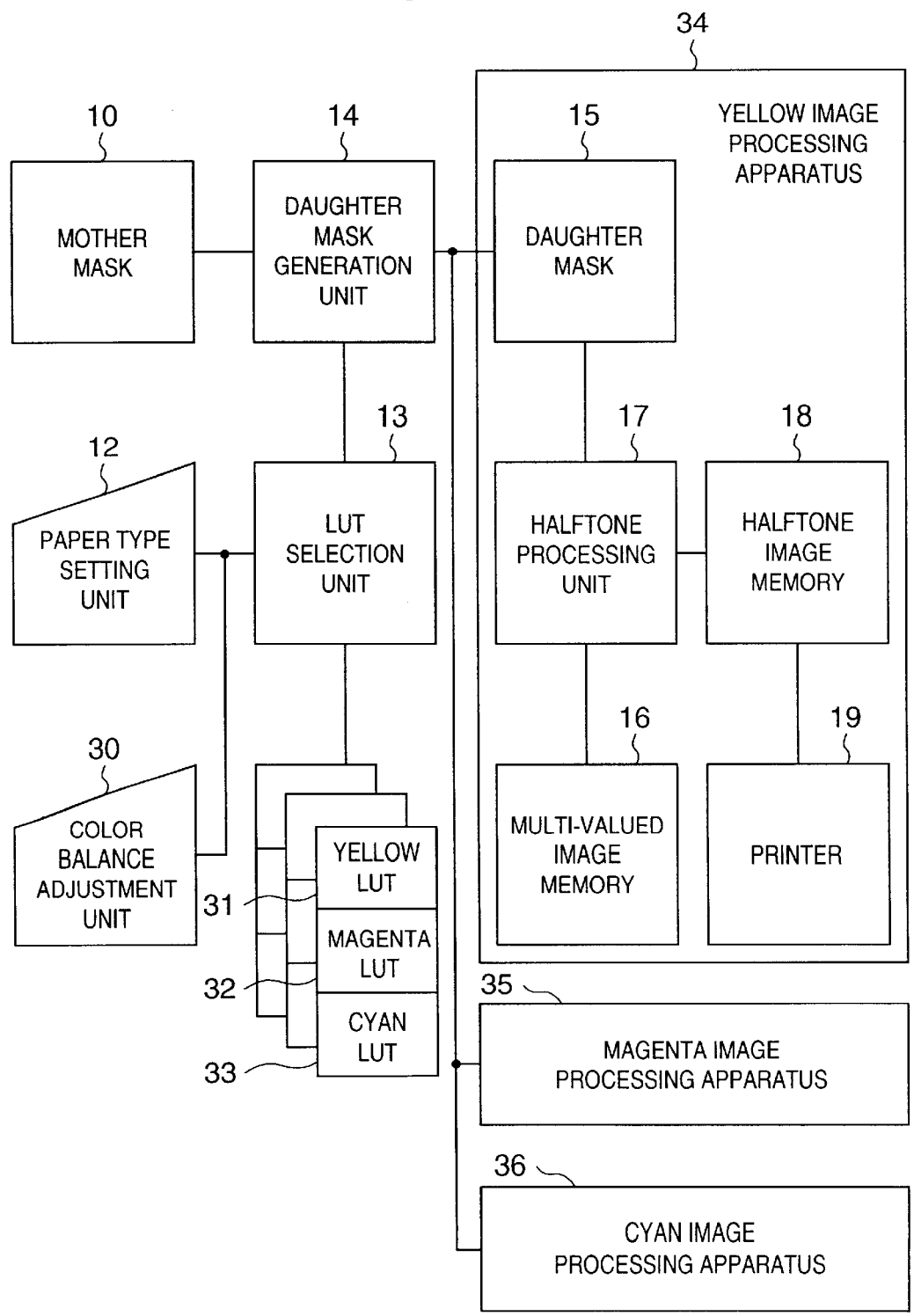
FIG. 17 is a block diagram showing the arrangement of an image processing apparatus according to the third embodiment of the present invention.

FIG. 17 is a block diagram showing the arrangement of an image processing apparatus according to the third embodiment. In the third embodiment, a color image is printed using three color inks, i.e., yellow, magenta, and cyan inks, and halftoning is done for each of yellow, magenta, and cyan color components. Referring to FIG. 17, reference numeral 34 denotes a yellow image processing apparatus which performs the halftone and print processes of a yellow component. Reference numeral 35 denotes a magenta image processing apparatus which performs the halftone and print processes of a magenta component. Reference numeral 36 denotes a cyan image processing apparatus which performs the halftone and print processes of a cyan component. Note that the image processing apparatuses of the respective color components have the same arrangement, i.e., each comprises a daughter threshold mask 15, multi-valued image memory 16, halftone processing unit 17, halftone image memory 18, and printer 19. Also, the operation of the halftone processing unit of each color component is the same as that of the first embodiment.

Reference numeral 31 denotes LUTs that store output characteristics of the yellow printer in units of paper types. Reference numeral 32 denotes LUTs that store output characteristics of the magenta printer in units of paper types. Reference numeral 33 denotes LUTs that store output characteristics of the cyan printer in units of paper types. Reference numeral 30 denotes a color balance adjustment unit which can arbitrarily adjust the input/output characteristics of the individual color components.

In general, in a color print process, even when inks are printed at the same density to overlap each other, achromatic gray cannot be obtained due to, e.g., excessive absorption of inks. For this reason, the input/output characteristics of inks must be adjusted to print achromatic gray.

FIG. 18 shows a color balance for outputting achromatic gray on a given paper sheet. The ordinate plots the optical density obtained by solely printing each ink and measuring it via a spectral filter of status T. The abscissa plots the optical density of gray printed by printing three color inks to overlap each other. For example, as can be seen from FIG. 18, in order to output achromatic gray with a density "0.8", yellow ink with a density "0.3", magenta ink with a density "0.4", and cyan ink with a density "0.8" can be printed to overlap each other.

The characteristics shown in FIG. 18 are input from the color balance adjustment unit 30.

When a color image is printed by the image processing apparatus of this embodiment, a daughter mask generation unit 14 generates daughter threshold masks in units of color components in the following procedures.

In halftoning a yellow component, a correction value corresponding to a yellow input value is obtained from the color balance adjustment unit and yellow printer output characteristic LUT 31.

Assume that an input value I of each of yellow, magenta, and cyan, and a density END has a relationship given by:

$$END = I \times 1.6/255$$

Densities END corresponding to all input values "0" to "255" of yellow are computed by the above equation. Then, a yellow density D for achieving a gray balance is obtained from the densities END using FIG. 18.

The number of ON dots for outputting the yellow density D is then computed. This computation can be made in the same manner as in the second embodiment. That is, if the output characteristic LUT of a yellow component corresponding to a given paper type is stored in the format shown in FIG. 16, the number O of ON dots with respect to the yellow density D can be obtained by:

$$i = \text{Int}(D \times 100)$$

$$O = (O[i+1] - O[i]) \times (D \times 100 - i) + O[i]$$

where i is the LUT address, and O[i] is the number of ON dots corresponding to i. After the numbers of ON dots corresponding to all yellow input values are obtained in this manner, a daughter threshold mask is generated by the same method as in the first and second embodiments.

By executing the aforementioned process in units of color components, threshold masks used to execute halftone processes of a color image that maintains a gray balance can be generated.

As described above, according to the third embodiment, since threshold masks in units of inks are sequentially generated from the LUTs 31 to 33 having output characteristics corresponding to a given paper type in units of inks, and input/output characteristics arbitrarily designated in units of inks, a color image with an arbitrary color balance can be output by a small memory size without impairing precision by intermediate computations.

[Fourth Embodiment]

Figure 19:
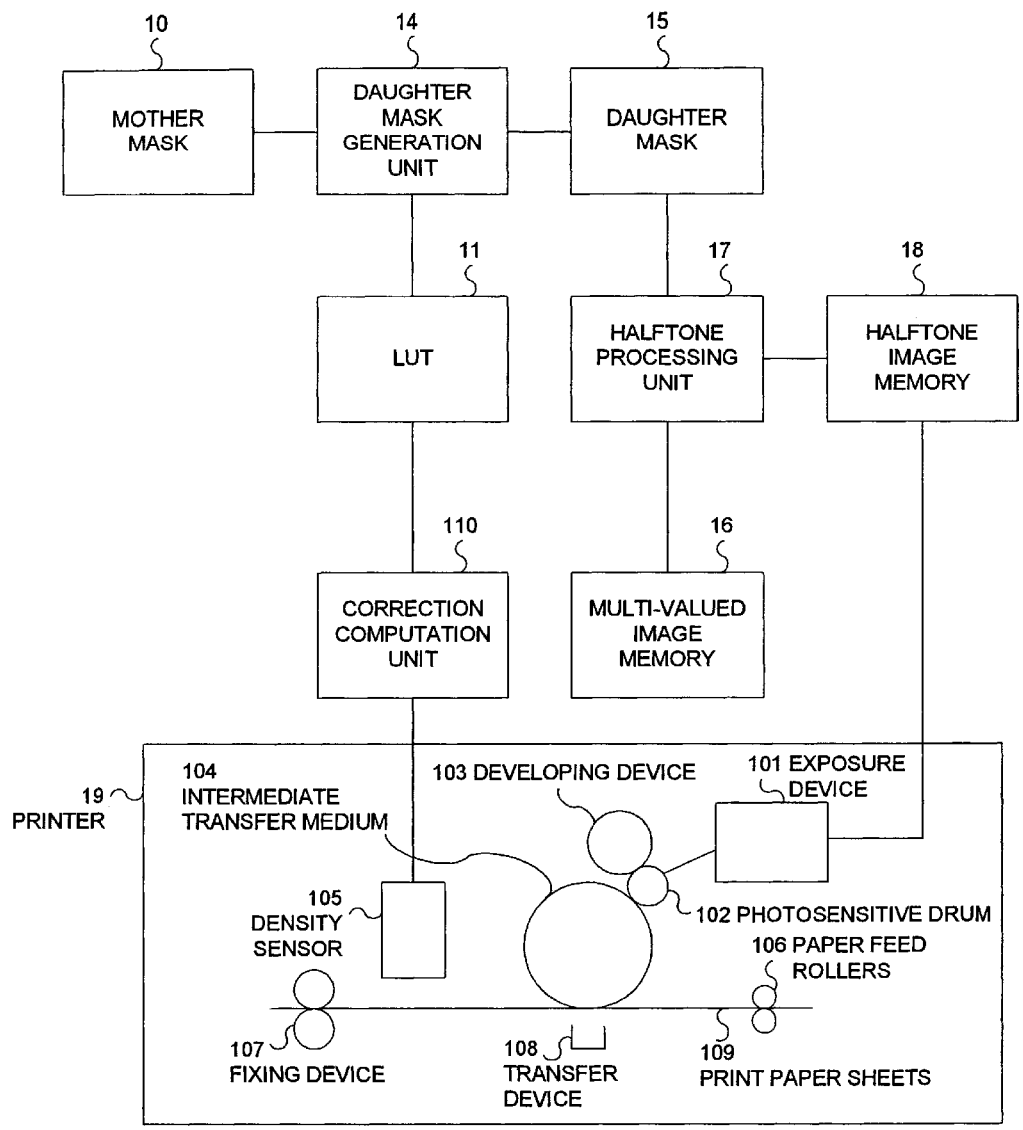
FIG. 19 is a block diagram showing the arrangement of an image processing apparatus according to the fourth embodiment of the present invention.

FIG. 19 is a block diagram showing the arrangement of an image processing apparatus according to the fourth embodiment of the present invention. The same reference numerals in FIG. 19 denote the same parts as those in FIG. 1. A printer 10 forms an image by electrophotography, and comprises an exposure device 101, photosensitive drum 102, developing device 103, intermediate transfer medium 104, density sensor 105, paper feed rollers 106, fixing device 107, transfer device 108, print paper sheets 109, and the like. Reference numeral 110 denotes a correction computation unit for computing a density correction table from the output of the density sensor.

The print operation of the printer 19 will be explained below.

The photosensitive drum 102 is prepared by forming a photosensitive layer of, e.g., an organic photo-semiconductor or the like on the surface of a conductive drum base, and is rotated at a predetermined peripheral velocity by a drive means (not shown). Furthermore, the surface of the photosensitive drum 102 is uniformly charged by a charger (not shown) to a predetermined polarity and potential.

The exposure device 101 emits a laser beam from a laser diode and scan device (not shown) onto the surface of the photosensitive drum 102 in accordance with image data from a halftone image memory 18. On the surface of the photosensitive drum 102, charges corresponding to portions irradiated with the laser beam are removed, and an electrostatic latent image corresponding to image information is formed. Note that a light-emitting diode array may be used in place of the aforementioned arrangement of the exposure. device 101.

The developing device 103 applies toner onto the electrostatic latent image on the photosensitive drum to develop it as a toner image.

The toner image on the photosensitive drum 102 is primarily transferred onto the intermediate transfer medium 104 by a primary transfer means (not shown). The intermediate transfer medium 104 has a drum shape, and contacts the photosensitive drum 102. Note that the intermediate transfer medium may use a belt in place of the drum.

After primary transfer of the toner image, the residual toner on the photosensitive drum is removed by a cleaning device (not shown).

The primary transfer image is transferred onto a paper sheet 109 by the transfer device 108. The paper sheet 109 is fed between the intermediate transfer medium 104 and transfer device 108 by the paper feed rollers 106. The toner image which has been transferred onto the paper sheet is heated and pressed by the fixing device 107, and is fixed on the paper sheet.

With a series of operations mentioned above, a halftone image is formed on the print sheet.

The image density of such printer often varies depending on various conditions such as the use environment (temperature, humidity), total print count, and the like. To avoid such variations, a toner image for density detection is formed as a sample on the photosensitive drum or intermediate transfer medium, and its density is automatically detected. The detection result is fed back to the halftone process to obtain a stable image. The sequence for correcting variations of the printer will be explained below.

Figure 7:
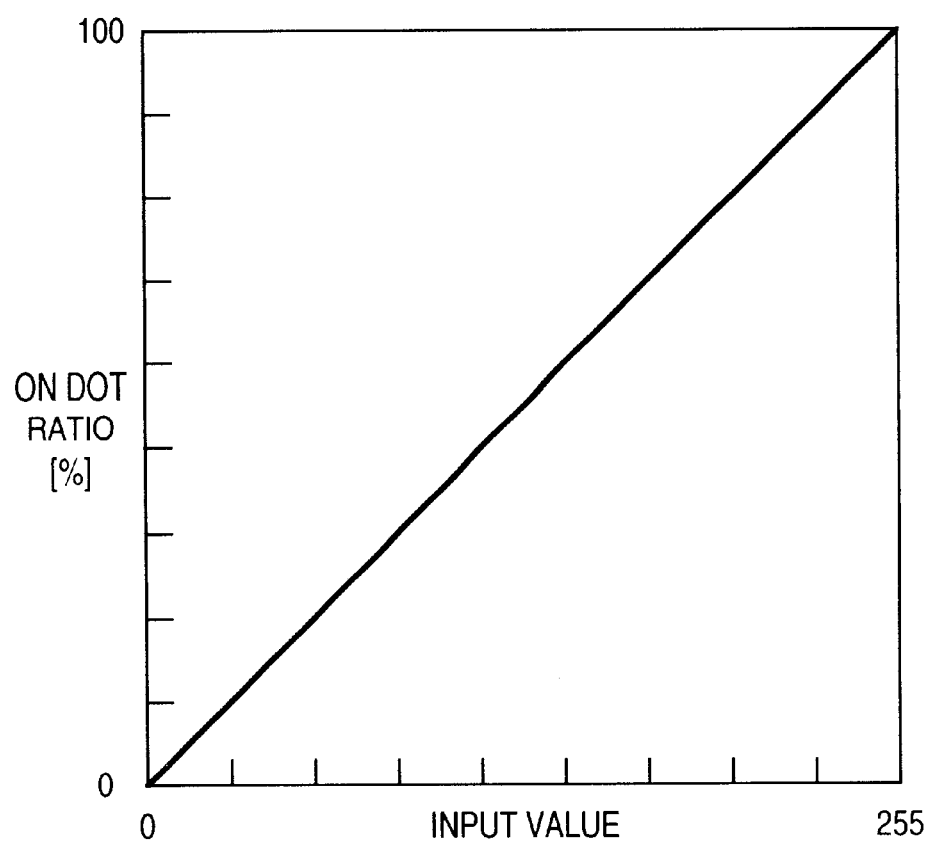
FIG. 7 is a graph showing the relationship between the input value and ON dot ratio.

A daughter mask is generated using a non-correction LUT having a relationship between the input value and ON dot ratio shown in FIG. 7. FIG. 8 shows an example of the non-correction LUT. The number O of dots and an input value I satisfy:

$$O = \text{Int}\{(I/255) \times 65536\}$$

where Int(x) is a function of obtaining the integer part of x.

Subsequently, a step chart, in which the input value increases stepwise, as shown in FIG. 9, undergoes the halftone process to form an image on the intermediate transfer medium 104 by the printer. The densities of patches of the output step chart are measured by the density sensor 105. The density detection signal is analyzed by the correction computation unit 110 and is converted into a predicted density on an actual paper sheet. The density is predicted by measuring the relationship between the sensor output voltage and print density by tests beforehand, and estimating that relationship. FIG. 20 shows an example of the relationship between the output voltage V of the density sensor 105 and predicted density D.

Subsequently, a correction LUT for obtaining a relationship in which density increases in proportion to the input value is obtained. The graph of quadrant I shown in FIG. 11 represents the total characteristics to be finally obtained, i.e., characteristics in which the density is proportional to the input value. Also, the graph of quadrant III represents the relationship between the ON dot ratio, which is obtained by converting the input value, and the output density. A case will be examined below wherein a correction value corresponding to an input value "128" is obtained. An output density "0.8" is obtained from the total characteristic graph of quadrant I with respect to the input value. That is, in order to obtain the output density "0.8" from the characteristic graph of quadrant III, the ON dot ratio can be set at 36%.

Therefore, the correction table can correct to set 36% ON dots with respect to the input value "128". In this manner, correction values corresponding to all input values can be obtained.

In an actual print process, a daughter mask is generated based on the correction table by the same procedures as in the first embodiment to form a halftone image.

Note that prediction precision can be improved by using environment data such as temperature, humidity, and the like in analysis in addition to the density detection signal.

With the above arrangement, a stable output free from any variations of the image density depending on various conditions such as the use environment (temperature, humidity), total print count, and the like can be obtained.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a threshold mask storage unit for storing a first threshold mask having threshold values corresponding to a number of gray levels, wherein the number of gray levels of the first threshold mask is larger than the number of gray levels of an input image;
   a selection unit for selecting one tone reproduction characteristic from a plurality of tone reproduction characteristics;
   a generation unit for generating a second threshold mask having threshold values corresponding to a number of gray levels, wherein the number of gray levels of the second threshold mask is equal to the number of gray levels of the input image, from the first threshold mask stored in said threshold mask storage unit on the basis of the tone reproduction characteristic selected by said selection unit;
   a conversion unit for converting a pixel value of the input image using the second threshold mask generated by said generation unit; and
   an output unit for outputting the image converted by said conversion unit to an output apparatus.

2. The apparatus according to claim 1, wherein said selection unit includes a designation unit for designating a type of paper onto which the image is output, and selects a tone reproduction characteristic corresponding to the designated type of paper.

3. The apparatus according to claim 1, wherein the tone reproduction characteristic represents a number of output dots respectively corresponding to a plurality of input values, and
   said generation unit determines an input value by comparing the threshold values of the first threshold mask with the number of output dots of the selected tone reproduction characteristic, and sets the determined value as a threshold value of the second threshold mask.

4. The apparatus according to claim 1, further comprising a gamma characteristic designation unit for designating a gamma characteristic, and
   wherein said generation unit generates the second threshold mask from the first threshold mask stored in said threshold mask storage unit on the basis of the tone reproduction characteristic selected by said selection unit, and the gamma characteristic designated by said gamma characteristic designation unit.

5. The apparatus according to claim 1, wherein the tone reproduction characteristic is generated by outputting a plurality of patches for density detection onto a paper sheet, and measuring densities of the output patches.

6. The apparatus according to claim 1, wherein the tone reproduction characteristic is generated by forming a plurality of patches for density detection inside the output apparatus, and measuring densities of the formed patches.

7. The apparatus according to claim 1, further comprising a color balance instruction unit for instructing a color balance, and
   wherein said generation unit generates the second threshold mask from the first threshold mask stored in said threshold mask storage unit on the basis of the tone reproduction characteristic selected by said selection unit, and the color balance instructed by said color balance instruction unit.

8. An image processing method comprising:
   a threshold mask storage step, of storing, in a memory, a first threshold mask having threshold values corresponding to a number of gray levels, wherein the number of gray levels of the first threshold mask is larger than the number of gray levels of an input image;
   a selection step, of selecting one tone reproduction characteristic from a plurality of tone reproduction characteristics;
   a generation step, of generating a second threshold mask having threshold values corresponding to a number of gray levels, wherein the number of gray levels of the second threshold mask is equal to the number of gray levels of the input image, from the first threshold mask stored in the memory on the basis of the tone reproduction characteristic selected in said selection step;

a conversion step, of converting a pixel value of the input image using the second threshold mask generated in said generation step; and an output step, of outputting the image converted in said conversion step to an output apparatus.

9. The method according to claim 8, wherein said selection step includes a designation step, of designating a type of paper onto which the image is output, and selects a tone reproduction characteristic corresponding to the designated type of paper.

10. The method according to claim 8, wherein the tone reproduction characteristic represents a number of output dots respectively corresponding to a plurality of input values, and wherein said generation step includes a step of determining an input value by comparing the threshold values of the first threshold mask with the number of output dots of the selected tone reproduction characteristic, and setting the determined value as a threshold value of the second threshold mask.

11. The method according to claim 8, further comprising a gamma characteristic designation step, of designating a gamma characteristic, and wherein said generation step includes a step of generating the second threshold mask from the first threshold mask stored in the memory on the basis of the tone reproduction characteristic selected in said selection step, and the gamma characteristic designated in said gamma characteristic designation step.

12. The method according to claim 8, wherein the tone reproduction characteristic is generated by outputting a plurality of patches for density detection onto a paper sheet, and measuring densities of the output patches.

13. The method according to claim 8, wherein the tone reproduction characteristic is generated by forming a plurality of patches for density detection inside the output apparatus, and measuring densities of the formed patches.

14. The method according to claim 8, further comprising a color balance instruction step, of instructing a color balance, and wherein said generation step includes a step of generating the second threshold mask from the first threshold mask stored in the memory on the basis of the tone reproduction characteristic selected in said selection step, and the color balance instructed in said color balance instruction step.

15. A storage medium storing a program for executing an image processing method, said program comprising:

code for a threshold mask storage step, of storing, in a memory, a first threshold mask having threshold values corresponding to a number of gray levels, wherein the number of gray levels of the first threshold mask is larger than the number of gray levels of an input image;

code for a selection step, of selecting one tone reproduction characteristic from a plurality of tone reproduction characteristics;

code for a generation step, of generating a second threshold mask having threshold values corresponding to a number of gray levels, wherein the number of gray levels of the second threshold mask is equal to the number of gray levels of the input image, from the first threshold mask stored in the memory on the basis of the tone reproduction characteristic selected by said selection code;

code for a conversion step, of converting a pixel value of the input image using the second threshold mask generated by said generation code; and code for an output step of outputting the image converted by said conversion code to an output apparatus.

16. The medium according to claim 15, wherein said selection code includes code for a designation step, of designating a type of paper onto which the image is output, and selects a tone reproduction characteristic corresponding to the designated type of paper.

17. The medium according to claim 15, wherein the tone reproduction characteristic represents a number of output dots respectively corresponding to a plurality of input values, and said generation code includes code for a step of determining an input value by comparing the threshold values of the first threshold mask with the number of output dots of the selected tone reproduction characteristic, and setting the determined value as a threshold value of the second threshold mask.

18. The medium according to claim 15, wherein said method further comprises code for a gamma characteristic designation step, of designating a gamma characteristic, and wherein said generation code includes code for a step of generating the second threshold mask from the first threshold mask stored in the memory on the basis of the tone reproduction characteristic selected by said selection code, and the gamma characteristic designated by said gamma characteristic designation code.

19. The medium according to claim 15, wherein the tone reproduction characteristic is generated by outputting a plurality of patches for density detection onto a paper sheet, and measuring densities of the output patches.

20. The medium according to claim 15, wherein the tone reproduction characteristic is generated by forming a plurality of patches for density detection inside the output apparatus, and measuring densities of the formed patches.

21. The medium according to claim 15, wherein said method further comprises code for a color balance instruction step, of instructing a color balance, and wherein said generation code includes code for a step of generating the second threshold mask from the first threshold mask stored in the memory on the basis of the tone reproduction characteristic selected by said selection code, and the color balance instructed by said color balance instruction code.

* * * * *

UNITED STATES PATENT AND TRADEMARK OFFICE
CERTIFICATE OF CORRECTION

PATENT NO.    : 6,831,756 B1
DATED         : December 14, 2004
INVENTOR(S)   : Atsushi Ushiroda It is certified that error appears in the above-identified patent and that said Letters Patent is hereby corrected as shown below:

Column 7,
Line 15, "$R=10^- D$" should read -- $R=10^{-D}$ --.

Signed and Sealed this

Twenty-fourth Day of January, 2006

JON W. DUDAS
*Director of the United States Patent and Trademark Office*